O. P. McKEE.
SPRING WHEEL.
APPLICATION FILED NOV. 7, 1912.
1,054,587.
Patented Feb. 25, 1913.
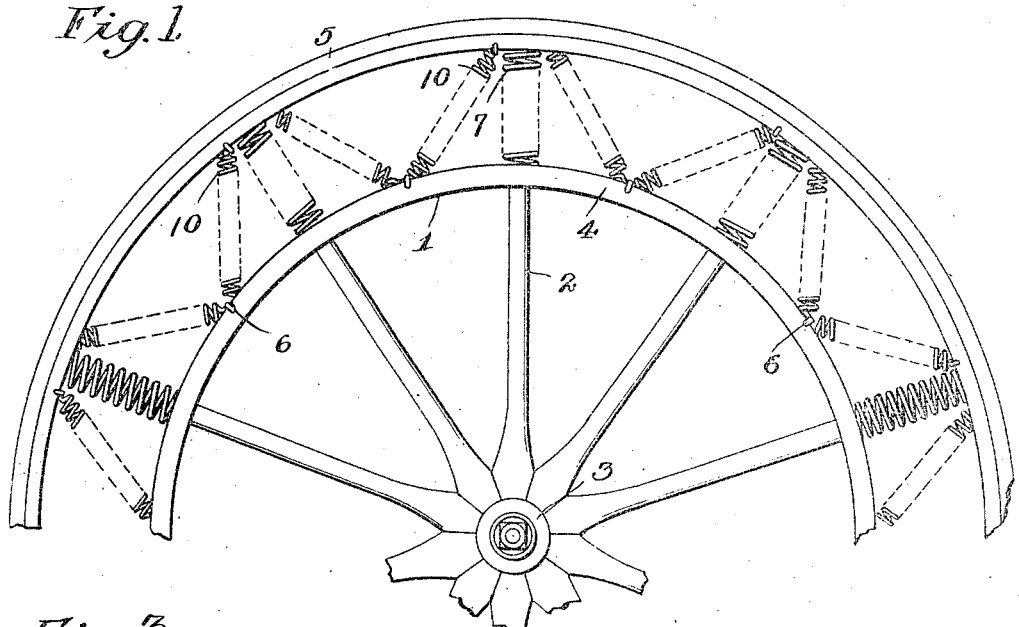
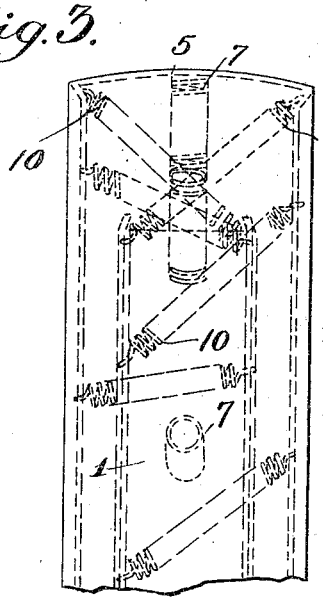
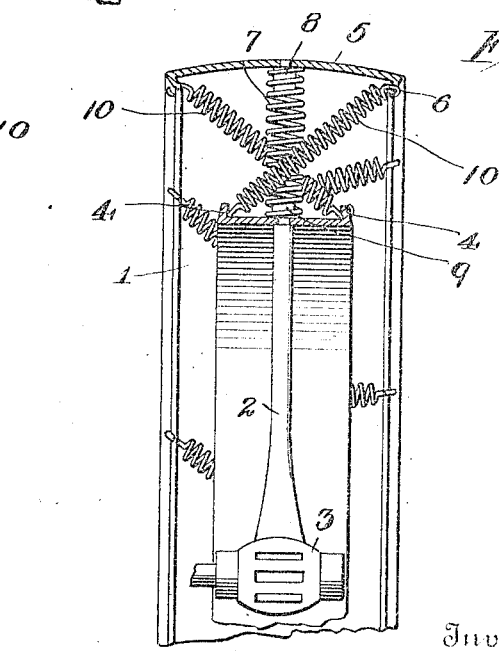
Witnesses
Inventor
O. P. McKee.
By
Attorney

UNITED STATES PATENT OFFICE.

OLIVER P. McKEE, OF WAUKESHA, WISCONSIN.

SPRING-WHEEL.

1,054,587.  Specification of Letters Patent. Patented Feb. 25, 1913.

Application filed November 7, 1912. Serial No. 730,062.

*To all whom it may concern:*

Be it known that I, OLIVER P. McKEE, a citizen of the United States, residing at Waukesha, in the county of Waukesha and State of Wisconsin, have invented certain new and useful Improvements in Spring-Wheels, of which the following is a specification.

The present invention relates to certain new and useful improvements in spring wheels, and has for its object to provide a wheel of this character which possesses all of the resiliency of a pneumatic tire.

A further object of the invention is to provide a spring wheel which is comparatively simple and inexpensive in its construction, which comprises few and durable parts which can be quickly assembled or replaced, and which will effectively absorb all the shocks and jars so as to prevent the same from being transmitted to the body of the vehicle.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation of a portion of a spring wheel constructed in accordance with the invention. Fig. 2 is a transverse sectional view through a portion of the rim of the wheel, and Fig. 3 is a plan view of a portion of the wheel, the arrangement and disposition of the compression and stabilizing springs being indicated by dotted lines.

Corresponding and like parts are referred to in the following description and indicated in all the views of the drawings by the same reference characters.

Specifically describing the present embodiment of the invention, the numeral 1 designates the inner rim of the wheel, the said inner rim being rigidly connected to the spokes 2 which radiate from the hub 3. This inner rim 1 is preferably formed of sheet metal and is of a material width, the opposite edges of the rim being formed with the annular outwardly projecting flanges 4 which are slightly inclined so as to converge toward each other Surrounding the inner rim 1 and spaced therefrom is the outer or floating rim 5, the said floating rim being transversely curved in cross section and being of a considerably greater width than the inner rim 1, so as to project laterally from opposite sides of the said inner rim. The opposite edges of the outer or floating rim 5 are formed with the inwardly extending flanges 6 which are inclined toward each other and have a converging relation. Interposed between the inner rim 1 and the outer rim 5 are the radially disposed helical compression springs 7, the said compression springs having the outer ends thereof engaged by inwardly projecting positioning-lugs 8 upon the outer rim 5, while the inner ends thereof are engaged by outwardly projecting positioning-lugs 9 upon the inner rim 1. The helical springs 7 are thus held securely against displacement, and these springs serve as a cushioning means between the inner fixed rim and the outer floating rim for the purpose of absorbing the sudden shocks and jars.

In order to hold the outer or floating rim 5 against lateral displacement, a series of stabilizing springs 10 are provided, the said springs being inclined both laterally and circumferentially of the wheel. At intermediate points between the various compression springs 7, the flanges 4 of the inner rim 1 are perforated for engagement with the ends of the springs 10. These springs 10 extend diagonally across the inner rim 1 in opposite directions and also diverge from each other radially, the outer end of one of the springs 10 being connected to the flange 6 of the outer rim 5 adjacent one of the tension springs 7, while the opposite end of the other spring 10 is connected to the opposite flange 6 of the outer rim 5 adjacent the other compression spring 7. It will thus be obvious that the stabilizing springs 10 connect the flanges 4 on one side of the wheel to the flanges 6 on the opposite side of the wheel and are inclined both laterally and circumferentially of the wheel in opposite directions so as to hold the outer rim 5 yieldingly in position and prevent either lateral displacement thereof or rotation thereof relative to the inner rim 1.

Having thus described the invention, what I claim as new and desire to secure by Letters Patent, is:—

A spring wheel including an inner rim provided at the edges thereof with outwardly projecting peripheral flanges which are inclined inwardly toward each other, an outer floating rim concentric with and spaced from the inner rim, the said outer floating rim having a greater width than the inner rim so as to project laterally upon opposite sides thereof and being provided at its edges with the inwardly extending peripheral flanges which are inclined inwardly toward each other, corresponding pairs of radial positioning lugs projecting from the middle portions of the outer and inner rims, radially disposed helical compression springs interposed between the two rims and having the ends thereof engaged by the said positioning lugs, and a pair of opposed laterally and circumferentially inclined stabilizing springs arranged between each adjacent pair of the compression springs, the inner ends of the stabilizing springs being connected to the peripheral flanges of the inner rim on opposite sides of the wheel at intermediate points between the compression springs, and the said stabilizing springs being extended laterally across the inner rim in opposite directions and inclined circumferentially in opposite directions so that the outer end of one of the stabilizing springs is connected to the peripheral flange of the floating rim adjacent one of the compression springs, while the outer end of the stabilizing spring is connected to the opposite peripheral flange of the floating rim adjacent the other compression spring.

In testimony whereof I affix my signature in presence of two witnesses.

OLIVER P. McKEE.

Witnesses:
C. H. JACOB,
J. G. GREDL.